(12) United States Patent
Nicholson et al.

(10) Patent No.: US 11,373,033 B2
(45) Date of Patent: Jun. 28, 2022

(54) DISPLAY OF INK INPUT AND DIGITAL RECOGNITION RESULTS

(71) Applicant: Lenovo (Singapore) Pte. Ltd., Singapore (SG)

(72) Inventors: John Weldon Nicholson, Cary, NC (US); Scott Edwards Kelso, Cary, NC (US); Bradley Park Strazisar, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 5 days.

(21) Appl. No.: 15/006,723

(22) Filed: Jan. 26, 2016

(65) Prior Publication Data

US 2017/0212879 A1    Jul. 27, 2017

(51) Int. Cl.
| | | |
|---|---|---|
| *G06F 40/10* | (2020.01) | |
| *G06F 40/171* | (2020.01) | |
| *G06F 3/04883* | (2022.01) | |
| *G06F 3/04845* | (2022.01) | |
| *G06F 3/0481* | (2022.01) | |
| *G06F 40/109* | (2020.01) | |

(52) U.S. Cl.
CPC .......... *G06F 40/171* (2020.01); *G06F 3/0481* (2013.01); *G06F 3/04845* (2013.01); *G06F 3/04883* (2013.01); *G06F 40/109* (2020.01); *G06F 2203/04803* (2013.01)

(58) Field of Classification Search
CPC .. G06F 3/0488; G06F 3/04883; G06F 17/242; G06F 17/2765; G06K 2209/01; G06K 9/00161
See application file for complete search history.

(56) References Cited

U.S. PATENT DOCUMENTS

| | | | | |
|---|---|---|---|---|
| 6,005,973 A | * | 12/1999 | Seybold ............. | G06K 9/00872 382/187 |
| 2004/0146216 A1 | * | 7/2004 | Andel .................... | G06V 30/15 382/277 |
| 2005/0220344 A1 | * | 10/2005 | Akiyama ........... | G06V 30/1423 382/187 |
| 2006/0233464 A1 | * | 10/2006 | Simmons ............... | G06K 9/222 382/321 |
| 2008/0170789 A1 | * | 7/2008 | Thacker ............. | G06V 30/1423 382/186 |
| 2014/0363082 A1 | * | 12/2014 | Dixon .................. | G06V 30/333 382/187 |
| 2014/0363083 A1 | * | 12/2014 | Xia ..................... | G06K 9/00436 382/189 |
| 2015/0169975 A1 | * | 6/2015 | Kienzle .................... | G06K 9/34 382/189 |
| 2016/0232146 A1 | * | 8/2016 | Su ......................... | G06F 40/143 |

* cited by examiner

*Primary Examiner* — Maikhanh Nguyen
(74) *Attorney, Agent, or Firm* — Ference & Associates LLC (57) ABSTRACT

One embodiment provides a method, including: accepting, at an input surface, ink input; determining, using a processor, typeset for the ink input; providing, on a display, a combined display of the ink input and the typeset; where the combined display visually associates the ink input and the typeset. Other aspects are described and claimed.

15 Claims, 6 Drawing Sheets

//<br>
DISPLAY OF INK INPUT AND DIGITAL RECOGNITION RESULTS

BACKGROUND

Electronic devices such as tablets, smart phones, laptop computers, kiosks, payment stations, etc., increasingly afford users an opportunity to enter handwriting input, hereinafter "ink input." The ink input is provided by a user's finger or stylus, e.g., to a touch screen or other input surface, and displayed on the screen. The ink input is changed into digitized text or may be converted into a graphic or image (hereinafter "typeset"), e.g., for insertion into another application such as an email or word processing program.

When providing such digital handwriting input to a conventional device, there are some shortcomings. As may be appreciated by use of conventional devices, currently the conversion from ink input to typeset is not perfect, particularly for drawing or other symbol data. Moreover, ink input is typically converted into typeset and thereafter the ink is not retrievable. Thus, fixing a mistake in the conversion is difficult. Sometimes only a minor modification to the ink data is needed to get a correct translation, such as crossing a "t" or extending/shortening a loop on an "e" or like changes. Conventionally, however, there is no way to go back to ink data after conversion (which is usually necessary to share the content with others).

This and other difficulties stem from an approach to ink input that treats the ink input as unidirectional, i.e., from ink input to typeset, and conventional systems do not afford the user the opportunity to see the typeset and ink input at the same time or switch rapidly between the two representations of the user input.

Thus, even if a user would prefer to see the ink input in display form, since that is the form in which the content was collected, and the brain is better able to recall and associate the abstract content with the visual input and memory, and even the muscle memory from the initial writing, there are no known existing solutions to treat the input data as both ink input and typeset simultaneously, and for the user to be able to see the user input data in both forms.

BRIEF SUMMARY

In summary, one aspect provides a method, comprising: accepting, at an input surface, ink input; determining, using a processor, typeset for the ink input; providing, on a display, a combined display of the ink input and the typeset; wherein said combined display visually associates the ink input and the typeset.

Another aspect provides a device, comprising: a display; an input surface; a processor operatively coupled to the display and the input surface; a memory device that stores instructions executable by the processor to: accept, at the input surface, ink input; determine typeset for the ink input; provide, on the display, a combined display of the ink input and the typeset; wherein said combined display visually associates the ink input and the typeset.

A further aspect provides a product, comprising: a storage device having code stored therewith, the code being executable by a processor and comprising: code that accepts, at an input surface, ink input; code that determines, using a processor, typeset for the ink input; code that provides, on a display, a combined display of the ink input and the typeset; wherein said combined display visually associates the ink input and the typeset.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described herein, users face a difficulty in that conventional input technology tends to display ink input only until the user enters it as typeset, but not thereafter. Thus, a user that wants to switch between the ink input display and the typeset display, or view both at the same time, is left frustrated. An existing approach provides a user with the ability to leave the ink input display as an ink representation in order to copy it out as typeset. However, in all known cases, when the original ink input data is converted to typeset, there is no way to convert it back to retrieve the ink input display, save performing an undo action, which is only available briefly.

Also, when copying the ink input data out as typeset, any modifications to that typeset after it has been pasted into a new location do not get fed back into the original source ink input display data, so that when a copy is performed again, the same modifications will need to be performed again. Further, this problem persists in other functionality, e.g., the modifications made to the typeset associated with ink input in conventional systems will not be available for the ink search functionality.

When correcting ink input to typeset text translations, the primary existing solution is to write something as ink input, press a button to transform it into typeset text, and use the undo stack to go back to ink input display if the translation was wrong, or to delete the incorrect word and re-write it in ink input again, and then try to convert it again. Another method is to just fix the converted typeset text with a keyboard and mouse, eschewing the stylus and handwriting input method.

As may be appreciated, the conventional approaches to handling ink input leave much to be desired. Accordingly, an embodiment embraces the dual nature of digital stylus-based input, i.e., the hand-written or drawn ink input and the digitized text or graphic transformation, referred to herein as typeset.

An embodiment provides a side-by-side view similar to a translated book, with the original ink input displayed on one side and the translated typeset displayed on the other side.

An embodiment provides a flashlight view, where one representation is dominant or displayed by default and another view or window is used to show the other representation. An embodiment stores the ink input data and the typeset data such that both may be displayed, simultaneously, and/or the user may switch back and forth between the display views rapidly.

For example, in a flashlight view, the dominant or default representation may be ink input, whereas a view or window will show the other, i.e., the typeset in this example. The position of the view or window may be determined in a variety of ways, e.g., determined by the hover position of the stylus, a touch or hover-touch input event, a mouse or cursor position, etc. The view or window may be displayed in a variety of shapes, e.g., circular, rectangular, etc. The view or window may be represented as a dynamic window, e.g., a floating window displayed on top of the default view or representation. The view or window may be located in a variety of locations, e.g., in-plane with the default view, offset there-from, etc.

The size or bounds of the view or window may be scaled, e.g., to accommodate the larger size of the ink input, or fixed in size. For example, if the flashlight mode is used to display a window over a long word such as antidisestablishmentarianism, then depending on the mode, either the whole word may be displayed into the window or view representation, or the radius (i.e., predetermined amount) may be fixed to the window's anchor position (e.g., hover position of the stylus), with the result that less than or more than the entire ink input word is displayed in a transformed window.

An embodiment may dynamically adjust either or both of the display of the ink input and the display of the typeset. For example, and particularly for a typeset display, there is commonly a large scale difference between ink input and typeset views, particularly if a small typeset font is chosen. As such, an embodiment may adjust, e.g., scale, the display (either or both of the ink input display and the typeset display) such that the scale differences are addressed appropriately.

An embodiment may re-flow the default or dominant view to make room for the window or view of the other representation. This mode may be used primarily for a default typeset view and an in-plane ink input view. In order to have the larger ink input representation fit without overlapping the typeset display, the typeset data may be moved (re-flowed) to accommodate the size of the ink input.

In side-by-side mode, the ink input display is typically larger than the typeset display, and so an embodiment may implement several methods to handle this occurrence. In an embodiment, the inter-line spacing of a paragraph of the typeset display may be changed such that the overall height of the paragraph matches the overall height of the ink display of the same paragraph. In another embodiment, the top of each paragraph (i.e., a paragraph of ink input and a paragraph of associated typeset) may be aligned, leaving the typeset display with the previous or default inter-line spacing so that it appears as it would when exported to another application (e.g., an e-mail application). In another embodiment, the cursor position (which includes any position indicated by a user, whether by moving an on-screen cursor, providing hover input, providing touch input, etc.) in a first representation (e.g., typeset) may be used to highlight data in the other representation (e.g., ink input). That is, when the user has the cursor position in the middle of a word or drawing in the typeset display, the same word or drawing is highlighted in the ink display side (and vice-versa).

With any or all of these methods, the user is able to both keep the ink display of the content on screen and maintain a correct translation of the ink input content to typeset form, thus enabling the ability to search and export the content.

The illustrated example embodiments will be best understood by reference to the figures. The following description is intended only by way of example, and simply illustrates certain example embodiments.

Figure 1:
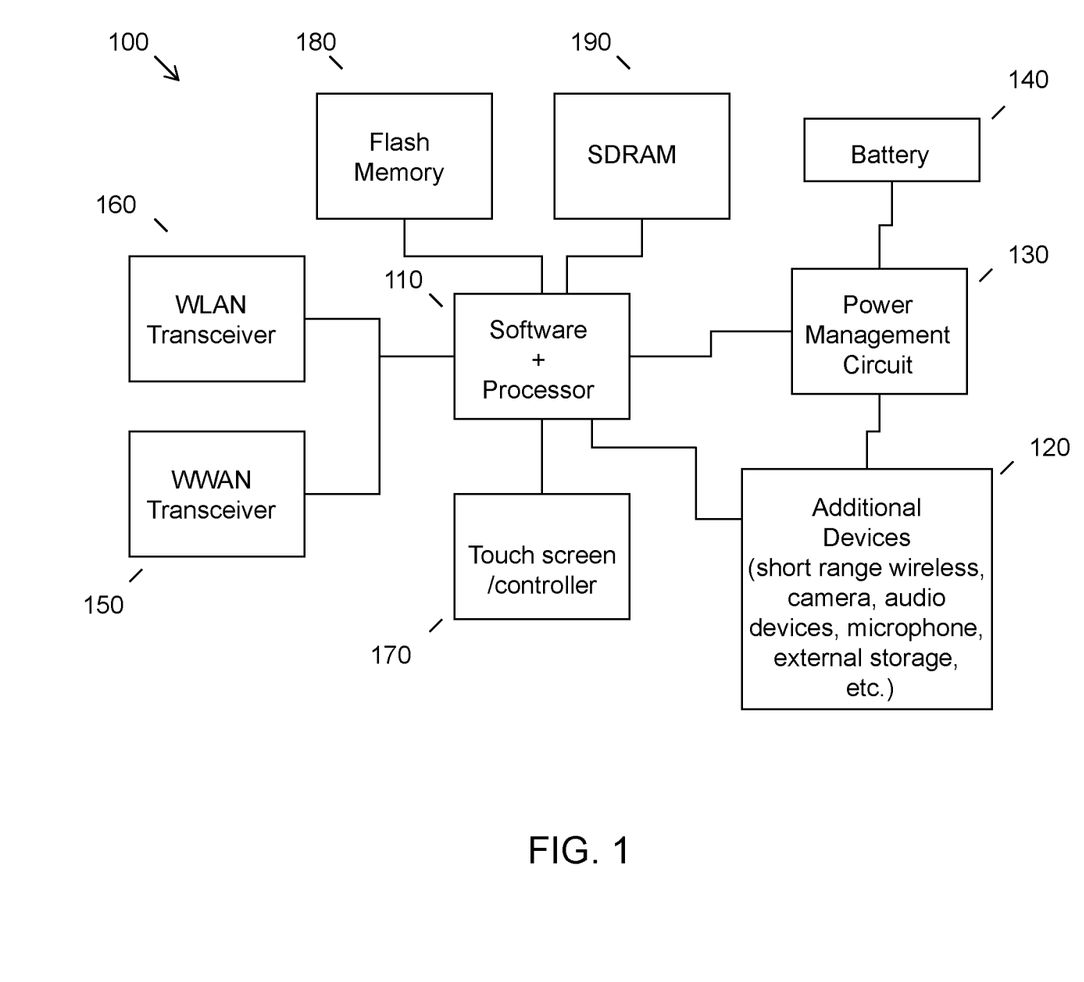
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio capture device such as a microphone. System 100 often includes a touch screen 170 for data input and display/rendering. System 100 also typically includes various memory devices, for example flash memory 180 and SDRAM 190.

Figure 2:
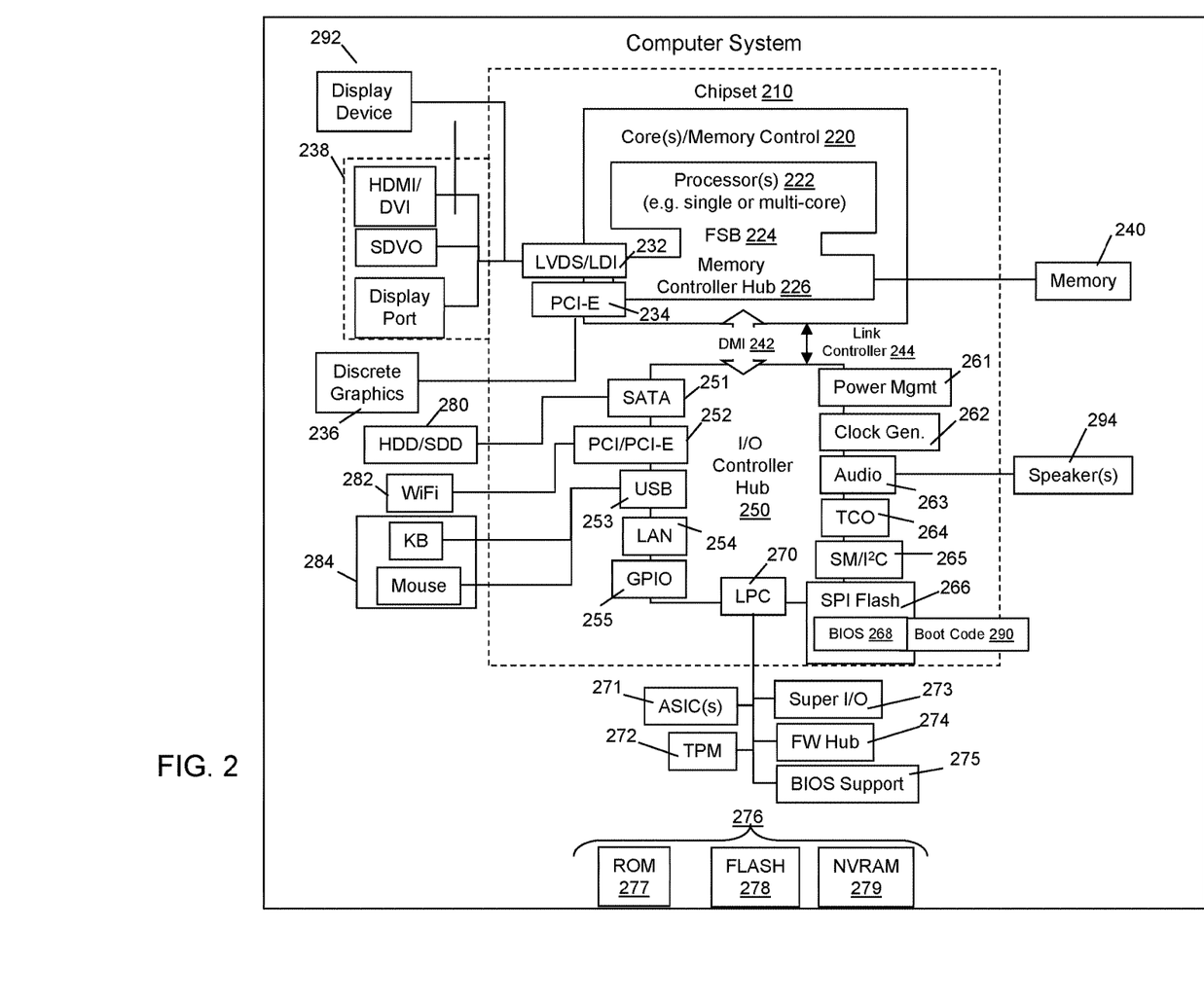
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices that accept ink input and process the ink input to form a digitized form thereof, e.g., typeset. An embodiment facilitates a combined display of the ink input and the typeset (which as used herein includes any graphic/image formed from the ink input), such that the user may view both in a display. As described further herein, the ink input and typeset is logically associated, e.g., by performing a handwriting analysis on the ink input to identify a typeset word or words, and thus the ink input and the typeset may be visually associated in the combined display using the logical association and potentially other parameters, such as user provided input, as further described herein. Specific examples of the combined display as well as example functionality of the various embodiments are described in further detail in connection with FIGS. 3-6.

Figure 3:
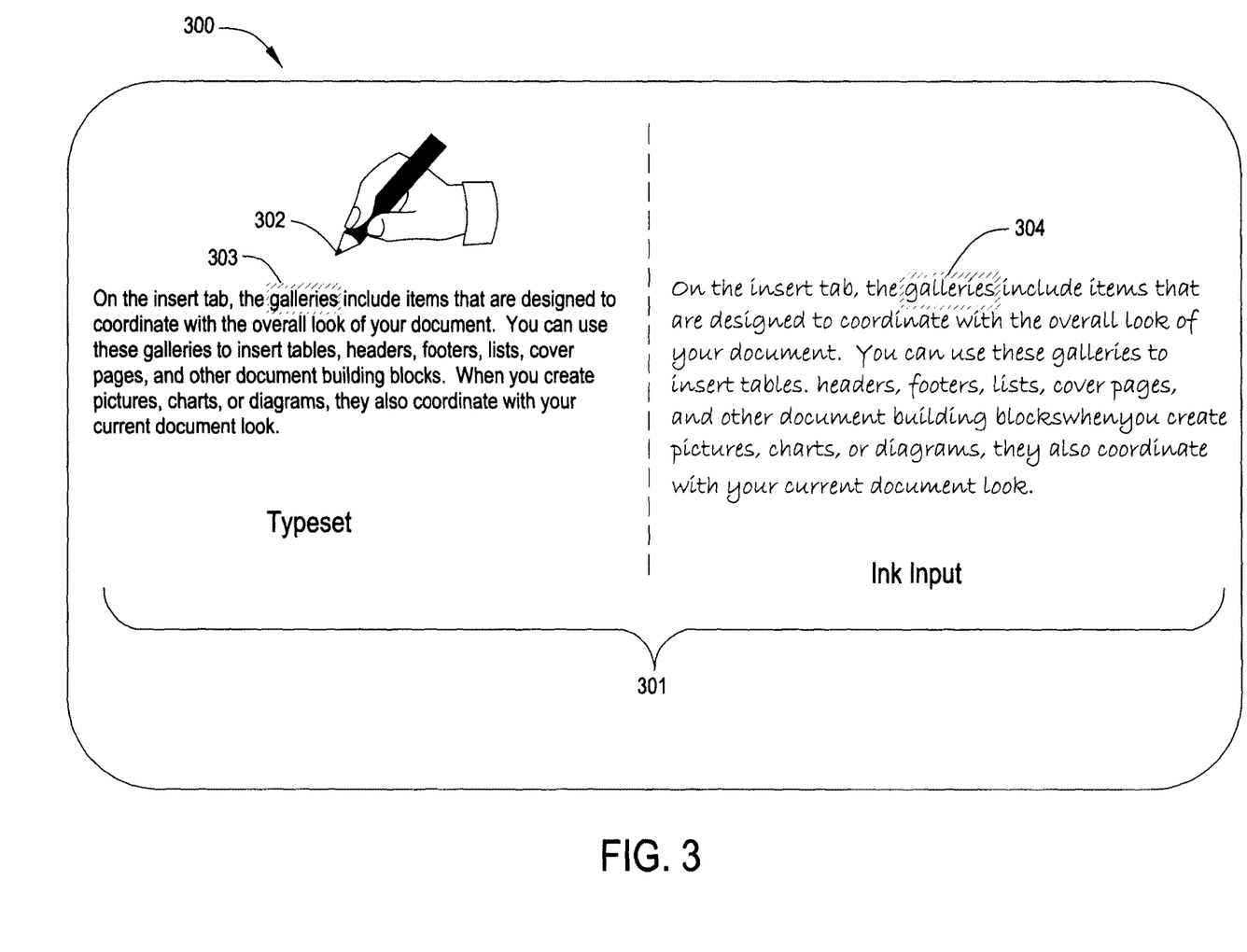
FIG. 3 illustrates an example combined display.

Referring now to FIG. 3, a device 300 such as a tablet computing device, etc., provides a combined display 301 that includes both ink input 304 and typeset 303 for the ink input. In the example illustrated in FIG. 3, the user has provided ink input 304 using a stylus and handwriting recognition software has converted the ink input 304 into typeset 303. The combined display 301 illustrated by way of example in FIG. 3 includes a side-by-side view, where the ink input 304 and the typeset 303 are visually associated. As described herein, the visual association may take a variety of forms.

It may first be observed that an embodiment provides for the ink input 304 to persist while the typeset 303 is also displayed. This allows a user to review the interpretation of the handwritten ink input 304, i.e., the typeset 303 chosen by the device's handwriting recognition software. Here, the ink input 304 and the typeset 303 are further visually associated in that the first line of ink input 304 and the first line of typeset 303 are aligned with one another in the combined display 301. As described herein, FIG. 3 illustrates how the typeset 303 often takes up less space than the ink input 304.

Moreover, illustrated in FIG. 3 is another visual association between the ink input 304 and the typeset 303. As shown, as the user hovers the stylus tip 302 over a word in the typeset 303, in this example "galleries," the typeset display 303 of the word "galleries" is visually distinguished (e.g., highlighted), as is the display of the corresponding data of the ink input 304. Thus, the user can quickly link or associate the typeset 303 with a particular part of the handwritten ink input 304 displayed in the combined display 301. An embodiment may also highlight typeset 303 in response to a user hovering a tip of a stylus 302 (or finger, etc.) over part of the ink input 304. This facilitates quicker review of the ink input 304 and revision thereof.

Figure 4:
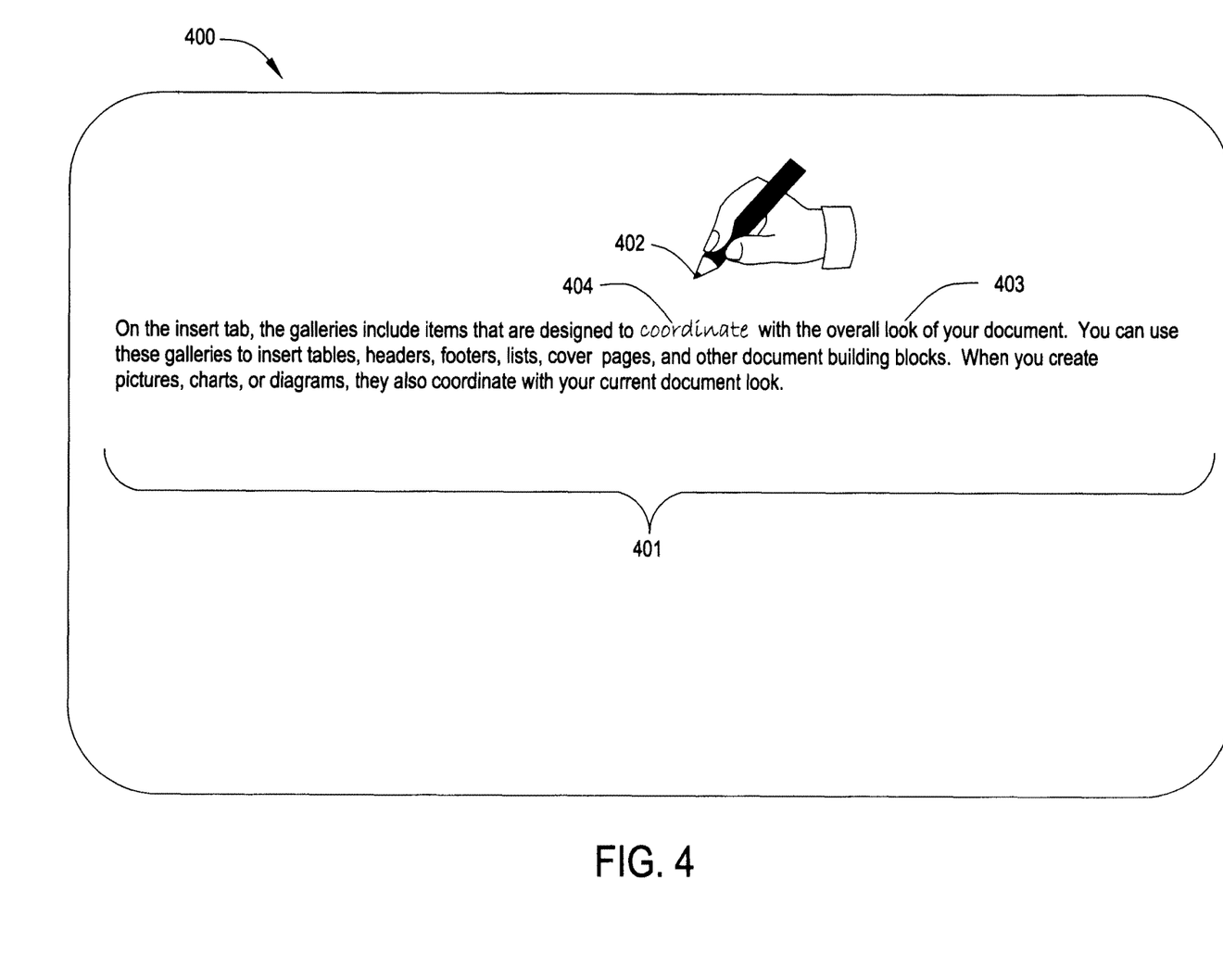
FIG. 4 illustrates an example combined display.

Another type of combined display 401 is illustrated in FIG. 4. Here, the combined display includes a dominant or default representation of typeset 403; however, this is a non-limiting example and the dominant or default representation may be that of ink input, e.g., as illustrated in combined display 301 at 304 of FIG. 3. The combined display dynamically adjusts such that if the user hovers a tip of the stylus 402 over a particular part of the typeset, here the word "coordinate," indicated at 404, the ink input data that the user provided to generate that typeset representation is displayed in the combined display. This facilitates a user's ability to correct errant typeset representations, e.g., if the device 400 makes a mistake in the handwriting input analysis, a user is quickly apprised of what the original ink input looked like.

Figure 5:
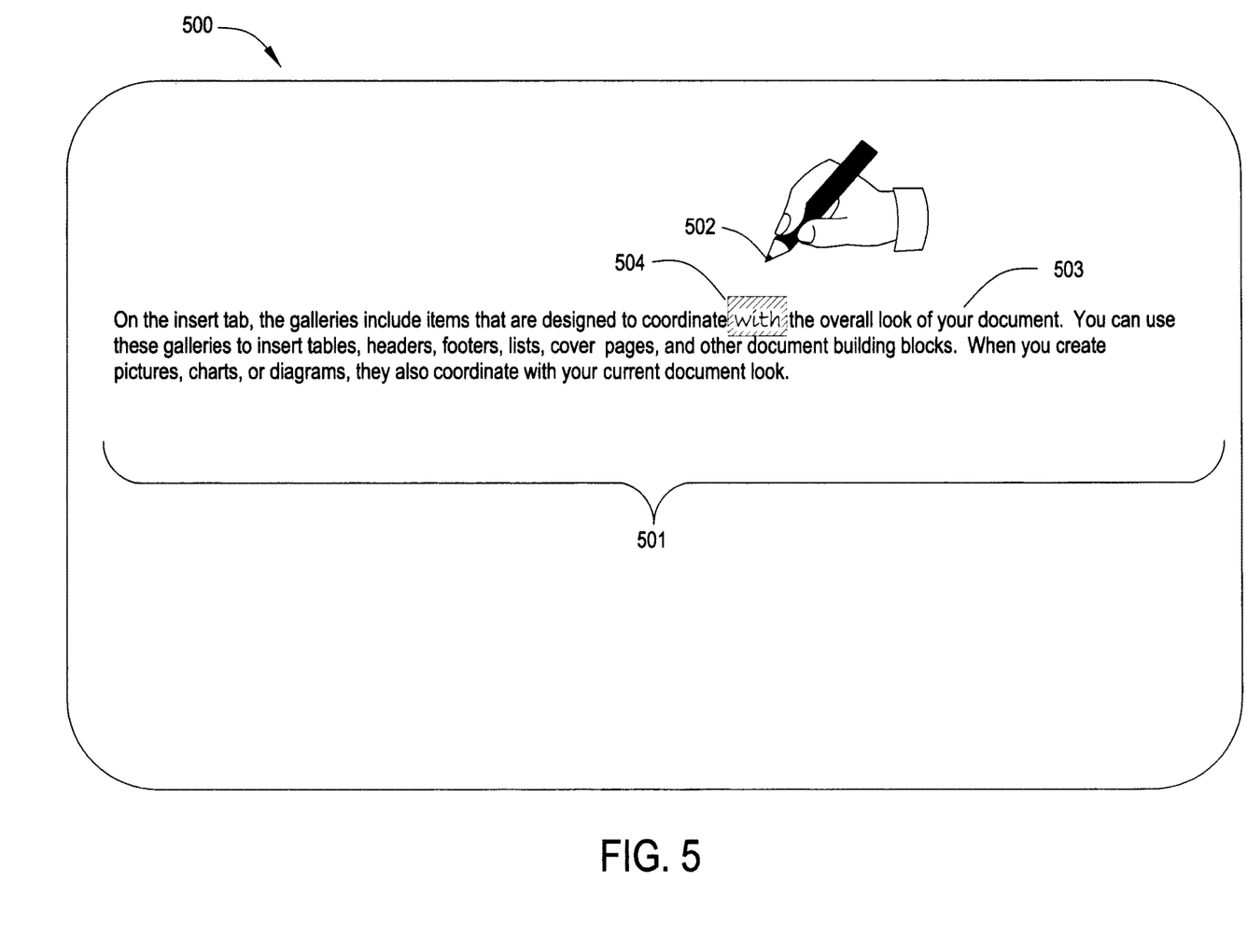
FIG. 5 illustrates an example combined display.

FIG. 5 shows another example of a combined display 501. Here, the user has moved the tip of the stylus 502 over the word "with," as indicated at 504, and the handwritten ink input used to generate that typeset result is displayed in a window in the same plane as the typeset 503. The window, as with other views, may be an overlay or the underlying display data (here typeset 503) may be reflowed and the other data (here ink input 504) may be inserted, e.g., as a graphic.

Thus, the user may again be quickly apprised of what handwritten ink input data was used to generate the typeset result. As with the other embodiments described here, the dominant or default representation, here that of typeset 503, may be reversed, i.e., ink input may be the default or dominant representation in the combined display 501.

An embodiment therefore facilitates the visual association of typeset representations of ink input data. The visual association is made possible by the simultaneous display capability where ink input and typeset are provided in a combined display.

Figure 6:
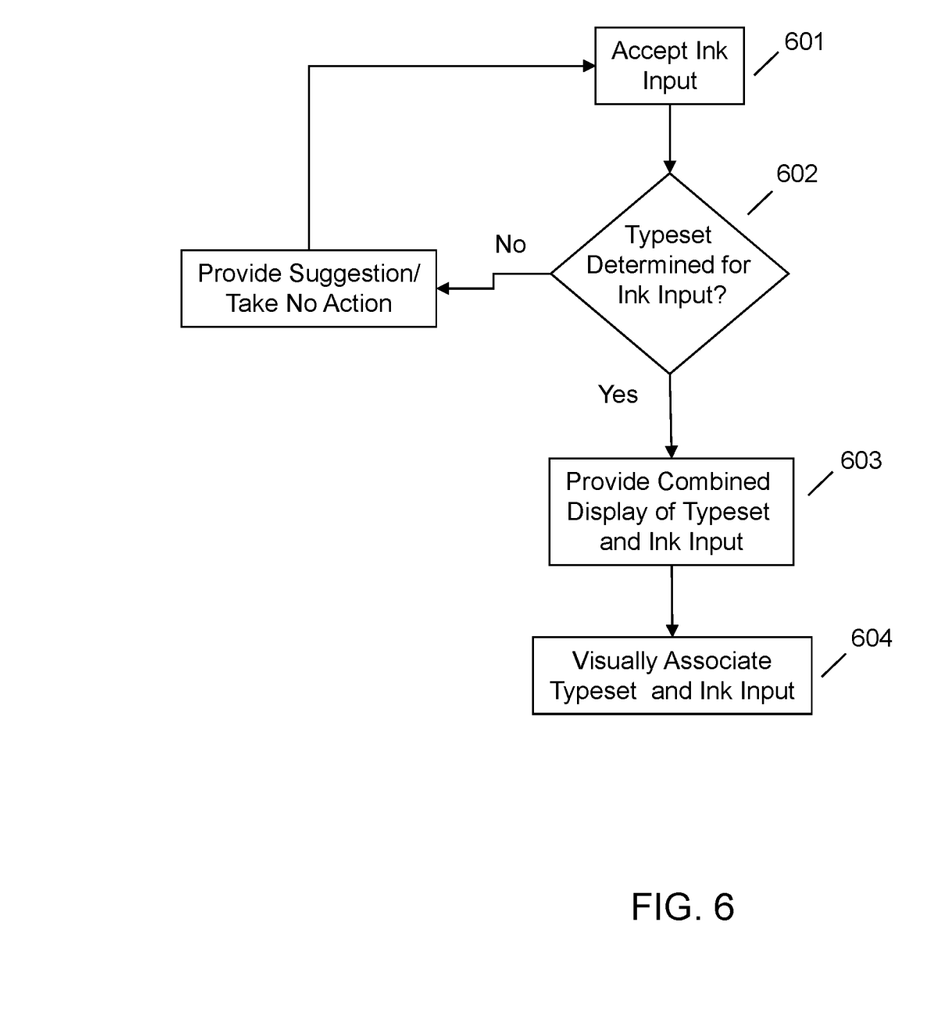
FIG. 6 illustrates an overview of an example method of providing a combined display.

As shown in FIG. 6, an embodiment accepts input at 601 and performs a handwriting analysis to determine a typeset for the ink input. If a typeset determination may be made, e.g., identifying a word, phrase or symbol, as illustrated at 602, an embodiment will provide a combined display as shown at 603. A combined display may be a side-by-side display, as illustrated in FIG. 5, or a dynamic combined display that displays alternate versions (of ink input or typeset, as dictated by the default or dominate mode) in response to user input. Each type of combined display is facilitated by storing the ink input data and the typeset data for use in various forms of combined display.

If a determination cannot be made at 602 as to what typeset representation is appropriate for the ink input data, an embodiment may take no action and await further input, an embodiment may take a predetermined action, such as providing a suggestion that the ink input be inserted as a graphic, etc.

The combined display provided at 603 may be adjusted in a variety of ways. For example, as discussed, a visual association between the typeset and the ink input may be provided, as indicated at 604. The visual association may include aligning the handwritten ink input display with the typeset display, aligning the typeset display with the handwritten ink input display, or a combination of the foregoing. Moreover, the visual association may include scaling, resizing and/or re-flowing the typeset, the handwritten ink input, or a suitable combination of the foregoing. This permits the visual display of the typeset and the ink input to be adjusted according to predetermined settings, user preferences (implied or expressed), etc.

In a further example, as illustrated in FIG. 4 and FIG. 5, the combined display and thus the visual association may be dynamically implemented, e.g., in response to a cursor position, such as the location of the stylus tip. Thus, an embodiment visually associates typeset (e.g., a word) with ink input (e.g., the handwritten ink input for that word). The visual association may be implemented by displaying a typeset representation of ink input, displaying an ink input representation of typeset, and/or highlighting (or otherwise visually indicating) one or more of the typeset and the ink input associated with a cursor location. As described herein, the nature of the visual association may take a variety of forms, e.g., highlighting an entire word, an entire line of text, a predetermined portion of data (e.g., part of a word within a defined radius of the cursor location/stylus tip), etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
accepting, at an input surface, ink input comprising a plurality of words;
determining, using a processor, typeset for the ink input, wherein the determining comprises converting the ink input of the plurality of words into typeset of the plurality of words, wherein the ink input of the plurality of words and the typeset of the plurality of words are linked;
providing, on a display, a default presentation of one of: the ink input and the typeset, wherein the other of the ink input and the typeset not provided in the default presentation is a non-dominant representation;
receiving a selection input on at least a portion of the default presentation; and
providing, based upon the selection input, a combined display of the ink input and the typeset, wherein the combined display comprises a simultaneous display of the portion and surrounding text of the default presentation and a corresponding portion and surrounding text of the non-dominant representation and wherein, responsive to receiving a user input modifying one of the typeset or the ink input in the combined display, the other of the typeset or the ink input in the combined display is dynamically adjusted to incorporate the modification, wherein the combined display comprises a visual association identifying a link between the dominant representation and the non-dominant representation, wherein the combined display comprises at least one of a flashlight view and a side-by-side view,
wherein the providing a combined display comprises scaling the typeset,
wherein the scaling proceeds dynamically in response to added ink input, and
wherein the combined display visually associates the ink input and the typeset dynamically.

2. The method of claim 1, wherein the side-by-side view comprises a side-by-side display of the ink input and the typeset.

3. The method of claim 1, wherein the combined display comprises a first view and a second view; each of the first view and the second view comprising one of the ink input and the typeset.

4. The method of claim 3, wherein the second view comprises a window.

5. The method of claim 4, wherein the window is displayed responsive to user input.

6. The method of claim 5, wherein the window is displayed in association with a cursor location.

7. The method of claim 1, further comprising receiving editing input in the combined display on the non-dominant representation, wherein the editing input for the non-dominant display comprises a gesture of at least one of: a hovering position of a stylus, a touch input, or a cursor position.

8. A device, comprising:
a display;
an input surface;
a processor operatively coupled to the display and the input surface;
a memory device that stores instructions executed by the processor to:
accept, at the input surface, ink input comprising a plurality of words;
determine typeset for the ink input, wherein to determine comprises to convert the ink input of the plurality of words into typeset of the plurality of words, wherein the ink input of the plurality of words and the typeset of the plurality of words are linked;
provide, on the display, a default presentation of one of: the ink input and the typeset, wherein the other of the ink input and the typeset not provided in the default presentation is a non-dominant representation;
receive a selection input on at least a portion of the default presentation; and
provide, based upon the selection input, a combined display of the ink input and the typeset, wherein the combined display comprises a simultaneous display of the portion and surrounding text of the default presentation and a corresponding portion and surrounding text of the non-dominant representation and wherein, responsive to receiving a user input modifying one of the typeset or the ink input in the combined display, the other of the typeset or the ink input in the combined display is dynamically adjusted to incorporate the modification, wherein the combined display comprises a visual association identifying a link between the dominant representation and the non-dominant representation, wherein the combined display comprises at least one of: a flashlight view and a side-by-side view,
wherein the instructions executed by the processor to provide a combined display comprise instructions to scale the typeset,
wherein the instructions executed by the processor to scale proceed dynamically in response to added ink input, and
wherein the combined display visually associates the ink input and the typeset dynamically.

9. The device of claim 8, wherein the side-by-side view comprises a side-by-side display of the ink input and the typeset.

10. The device of claim 8, wherein the combined display comprises a first view and a second view; each of the first view and the second view comprising one of the ink input and the typeset.

11. The device of claim 10, wherein the second view comprises a window.

12. The device of claim 11, wherein the window is displayed responsive to user input.

13. The device of claim 12, wherein the window is displayed in association with a cursor location.

14. The device of claim 8, wherein the instructions are further executable by the processor to receive editing input in the combined display on the non-dominant representation, wherein the editing input for the non-dominant display comprises a gesture of at least one of: a hovering position of a stylus, a touch input, or a cursor position.

15. A product, comprising: a non-transitory storage device having code stored therewith, the code is executed by a processor and comprising:
code that accepts, at an input surface, ink input comprising a plurality of words;

code that determines, using the processor, typeset for the ink input, wherein the determining comprises converting the ink input of the plurality of words into typeset of the plurality of words, wherein the ink input of the plurality of words and the typeset of the plurality, of words are linked;

code that provides, on a display, a default presentation of one of: the ink input and the typeset, wherein the other of the ink input and the typeset not provided in the default presentation is a non-dominant representation;

code that receives a selection input on at least a portion of the default presentation; and code that provides, based upon the selection input, a combined display of the ink input and the typeset, wherein the combined display comprises a simultaneous display of the portion and surrounding text of and a corresponding portion and surrounding text of the non-dominant representation and wherein, responsive to receiving a user input modifying one of the typeset or the ink input in the combined display, the other of the typeset or the ink input in the combined display is dynamically adjusted to incorporate the modification, Wherein the combined display comprises a visual association identifying a link between the dominant representation and the non-dominant representation, wherein the combined display comprises at least one of: a flashlight view and a side-by-side view, Wherein the code executed by the processor to provide a combined display comprise instructions to scale the typeset, wherein the code executed by the processor to scale proceed dynamically in response to added ink input, and wherein the combined display visually associates the ink input and the typeset dynamically.

* * * * *